United States Patent [19]
Nishida et al.

[11] Patent Number: 6,081,433
[45] Date of Patent: Jun. 27, 2000

[54] SWITCHING POWER SUPPLY APPARATUS

[75] Inventors: Akio Nishida; Koji Nakahira, both of Kyoto; Ryota Tani, Otokuni-gun, all of Japan

[73] Assignee: Murata Manufacturing Co., Ltd., Japan

[21] Appl. No.: 09/235,655

[22] Filed: Jan. 22, 1999

[30] Foreign Application Priority Data

Feb. 9, 1998 [JP] Japan .................................. 10-027372

[51] Int. Cl.[7] .................................................. H02M 3/335
[52] U.S. Cl. ........................................................ 363/19
[58] Field of Search .............................. 363/18, 19, 20, 363/21, 95, 97, 131

[56] References Cited

U.S. PATENT DOCUMENTS

| | | | |
|---|---|---|---|
| 4,630,186 | 12/1986 | Kudo | 363/19 |
| 4,694,385 | 9/1987 | Marius . | |
| 4,758,937 | 7/1988 | Usui et al. | 363/19 |
| 4,763,236 | 8/1988 | Usui | 363/19 |
| 4,862,338 | 8/1989 | Tanaka | 363/19 |
| 4,937,724 | 6/1990 | Nakajima | 363/56 |
| 5,012,399 | 4/1991 | Takemura et al. | 363/18 |

FOREIGN PATENT DOCUMENTS

| | | |
|---|---|---|
| 06234342 | 3/1996 | European Pat. Off. . |
| 880041 | 3/1996 | Japan . |

Primary Examiner—Matthew Nguyen
Attorney, Agent, or Firm—Ostrolenk, Faber, Gerb & Soffen, LLP

[57] ABSTRACT

A switching power supply apparatus comprises: a transformer having a primary winding, a secondary winding, and a feedback winding; a switching element connected in series with the primary winding; a control circuit provided between a control terminal of the switching element and the feedback winding; and a rectifying circuit connected to the secondary winding. The control element is provided between the control terminal of the switching element and one end of the feedback winding, and a delay circuit is connected to the control terminal of the control element.

11 Claims, 10 Drawing Sheets

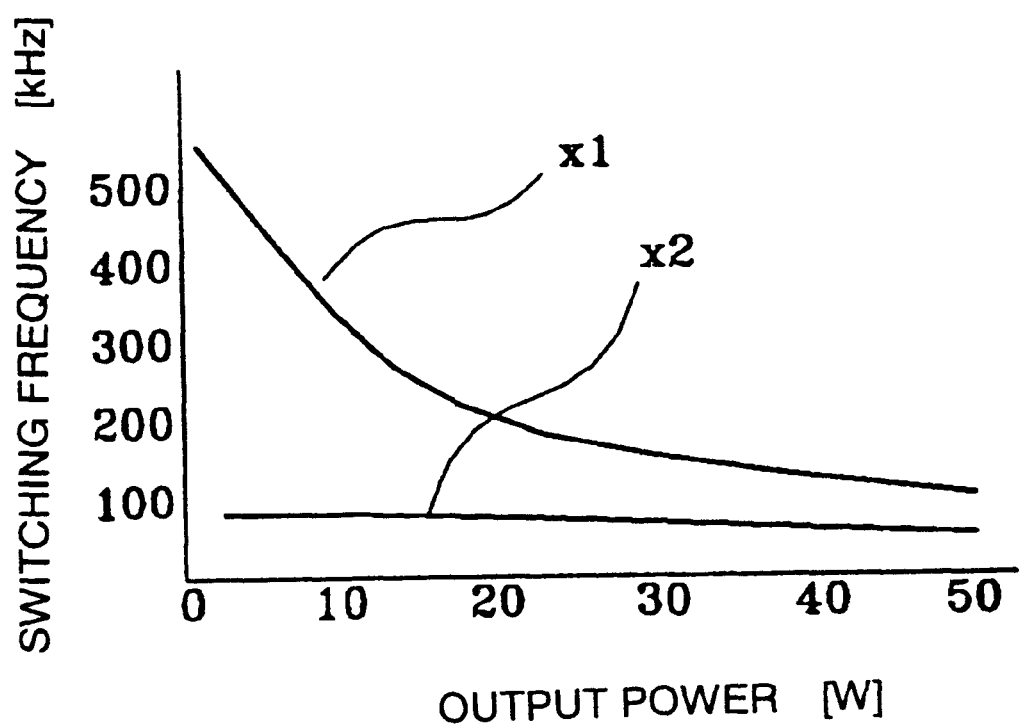

SWITCHING POWER SUPPLY APPARATUS

BACKGROUND OF THE INVENTION

1. Field of the Invention

The present invention relates to a switching power supply apparatus, more particularly, it concerns a switching power supply apparatus using the RCC (Ringing Choke Converter) system.

2. Description of the Related Art

Generally, equipment such as a VTR and a facsimile requires a stable DC voltage, and a switching power supply apparatus comprising an RCC system which is relatively simple in structure and highly efficient is extensively used to supply the stable DC voltage from the commercial AC power source.

FIG. 7 illustrates a switching power supply apparatus of the conventional RCC system. In FIG. 7, a switching power supply apparatus 1 comprises an input circuit 2, a DC—DC converter circuit 3, a voltage detection circuit 4, and a control circuit 5.

The input circuit 2 comprises a diode bridge DB for rectification, a fuse F and line filter LF provided between the AC power source and an input end of the diode bridge DB, and a smoothing capacitor C1 provided in parallel to an output end of the diode bridge DB.

The DC—DC converter circuit 3 comprises a transformer T having a primary winding N1, a secondary winding N2 of opposite polarity to the primary winding N1 and a feedback winding Nb of the same polarity as the primary winding N1, a switching element FET Q1 connected in series with the primary winding N1, a starting resistor R1 connected between one end of the primary winding N1 and the gate control terminal of the FET Q1, a diode D1 for rectification connected in series with the secondary winding N2, and a smoothing capacitor C4 connected between a cathode of the diode D1 and one end of the secondary winding N2.

The voltage detection circuit 4 provided on the output side of the DC—DC converter circuit 3 comprises a resistor R5, a light-emitting diode PD on the light emission side of a photo coupler PC, a shunt regulator Sr, and resistors R6,R7. The resistor R5, the light-emitting diode PD, and the shunt regulator Sr are connected in series, and provided in parallel to the capacitor C4 of the DC—DC converter circuit 3. The resistors R6 and R7 are also connected in series, and provided in parallel to the capacitor C4. A common connection of the resistor R6 to the resistor R7 is connected to the control terminal of the shunt regulator Sr.

The control circuit 5 comprises a resistor Rb and a capacitor C3 connected in series between one end of the feedback winding Nb and a gate of the FET Q1, a transistor Q2 connected between the gate of the FET Q1 and the other end of the feedback winding Nb, a resistor R2 connected between one end of the feedback winding Nb and a base of the transistor Q2, a resistor R3 and a capacitor C2 connected in parallel between the base and emitter of the transistor Q2, a resistor R4 connected in series between one end of the feedback winding Nb and the base of the transistor Q2, the diode D2 and a phototransistor PT on the light reception side of the photo coupler PC.

The operation of the switching power supply apparatus 1 illustrated in FIG. 7 is explained referring to the graph to FIG. 8 to indicate the change of the voltage and the current of each part of the switching power supply apparatus 1. In FIG. 8, Vgs denotes the voltage between the gate and source of the FET Q1, V1 denotes the voltage to be applied to the primary winding N1, I1 denotes the current flowing in the primary winding N1, Vds denotes the voltage between the drain and source of the, Vbe2 denotes the voltage between the base and emitter of the transistor Q2, Vb denotes the voltage generated in the feedback winding Nb, V2 denotes the voltage generated in the secondary winding N2 and I2 denotes the current flowing in the secondary winding N2. ON and OFF indicated at the upper part of the graph indicate the timing at which FET Q1 is turned from OFF to ON (hereinafter, referred to as "turn-ON"), and the timing at which the FET Q1 is turned from ON to OFF (hereinafter, referred to as "turn-OFF"), respectively.

Firstly, at the moment when the power source is turned ON at the start, the FET Q1 is in the OFF condition, and no current I1 flows in the primary winding N1, but current flows in the internal capacitance formed between the gate and the source of the FET Q1 through the starting resistor R1. The voltage Vgs between the gate and the source of the FET Q1 is increased, and the FET Q1 starts to turn ON at the time exceeding the threshold of the FET Q1. When the FET Q1 starts to turn ON, the voltage Vds between the drain and the source of the FET Q1 becomes approximately 0V, the input voltage is applied to the primary winding N1 of the transformer T, the current I1 starts to flow, and the voltages Vb and V2 are generated in the feedback winding Nb and the secondary winding N2. The current flows into the gate of FET Q1 from the feedback winding Nb through the resistor Rb and the capacitor C3. By the voltage Vb generated in the feedback winding Nb, the increase of the voltage Vgs between the gate and the source of the FET Q1 is accelerated, and FET Q1 is completely turned ON. The voltage V2 generated in the secondary winding N2 is the voltage reverse to the diode D1 for rectification, and no current I2 flows in the secondary winding N2.

When FET Q1 is turned ON and the voltage Vb of positive polarity is generated in the feedback winding Nb, the capacitor C2 is charged through the resistor R2, a resistor R4, a diode D4 and the photo-transistor PT which are described below, and the voltage across the capacitor C2, that is, the voltage Vbe2 between the base and the emitter of the transistor Q2 is increased. The charging speed (the time constant) is determined by the values of the resistors R2,R3, R4 and the capacitor C2 and the photo-transistor PT. When the voltage Vbe2 between the base and the emitter of the transistor Q2 is increased, and exceeds the forward voltage Vbe(on) 2 between the base and the emitter of the transistor Q2, the transistor Q2 is turned ON. When the transistor Q2 is turned ON, the voltage between the collector and the emitter of the transistor Q2, that is, the voltage Vgs between the gate and the source of FET Q1 is approximately 0V, and turns off the FET Q1.

When the FET Q1 starts to be turned off, the voltage V1 to be applied to the primary winding N1 is 0V, and the flowing current I1 is also 0. However, due to the magnetic energy accumulated in the transformer T by the current I1 flowing in the primary winding N1 when the FET Q1 is turned ON, a voltage of negative polarity is generated in the primary winding N1, the secondary winding N2, and the feedback winding Nb. A voltage of n-times (the turn ratio of the primary winding to the secondary winding) the voltage V2 of negative polarity generated in the secondary winding is generated in the primary winding. The current I2 generated by the voltage V2 of negative polarity generated in the secondary winding N2 flows through the diode D1 and is smoothed by the capacitor C4 and outputted. The voltage Vb of negative polarity generated in the feedback winding Nb rapidly absorbs the charge from the internal capacitance formed between the gate and the source of the FET Q1 through the capacitor C3 and the resistor Rb, and the FET Q1 is completely turned off. At the same time, the charge accumulated in the capacitor C2 is also absorbed through the resistor R2, a the reverse voltage is applied to the capacitor C2, and the capacitor C2 is further charged in the reverse direction, the voltage Vbe2 between the base and the emitter of the transistor Q2 is biased negative, and the transistor Q2 is turned OFF. The transistor Q2 is instantaneously turned ON only when it turns off the FET Q1.

The current I2 flowing in the secondary winding N2 when the FET Q1 is turned OFF, is gradually reduced as the magnetic energy from the transformer T is released, and finally becomes 0. When the current I2 flowing in the secondary winding N2 becomes 0, the voltages V2 and Vb generated in the secondary winding N2 and the feedback winding Nb tend to be attenuated in an oscillating manner with 0V on the boundary if they are left as they are. The voltage which is temporarily changed from the negative polarity to the positive polarity in the feedback winding Nb, is referred to as the "kick voltage". When the kick voltage is generated in the feedback winding Nb, the current flows from the feedback winding Nb into the internal capacitance formed between the gate and the source of the FET Q1 through the resistor Rb and the capacitor C3, and the voltage Vgs between the gate and the source of the FET Q1 is increased. When the kick voltage is not less than the prescribed value, the voltage Vgs between the gate and the source exceeds the threshold, and the FET Q1 is turned on. Because the starting resistor R1 is set to a large value, the current flowing through it is small, and it does not cause the FET Q1 to be turned on by the current flowing in the starting resistor R1 like starting. As the FET Q1 is turned on, the voltages V2 and Vb generated in the secondary winding N2 and the feedback winding Nb are forcibly increased to the positive polarity, and the oscillation of the voltage is forcibly terminated.

Subsequently, similar operation to that at starting is repeated, the FET Q1 is repeatedly turned on and turned off to be operated as the switching power supply apparatus.

The voltage stabilizing operation is finally described. In the voltage detection circuit 4, the output voltage is split by two resistors R6 and R7 for detection, and inputted in the shunt regulator Sr. The shunt regulator Sr compares the inputted voltage with the internal reference voltage, and causes a current to flow according to the difference.

When the load (not shown in the figure) to be connected to the switching power supply apparatus 1 is decreased, and the output voltage is increased, the voltage at the connection part of the resistor R6 to the resistor R7 is also increased, the input voltage to the shunt regulator Sr is increased to allow more current to flow. When the current flowing in the shunt regulator Sr is increased, the current flowing in the light-emitting diode PD of the photo coupler PC connected thereto in series is also increased, and the quantity of light emitted from the light-emitting diode PD is increased. When the quantity of light emitted from the light-emitting diode PD is increased, the current flowing in the photo-transistor PT of the photo coupler PC connected to the control circuit 5 is also increased. The current flowing in the photo-transistor PT is the current to charge the capacitor C2 together with the current flowing in the resistor R2 when the voltage Vb generated in the feedback winding Nb is of the positive polarity as described above, and when the current flowing in the photo-transistor PT is increased, the time to charge the capacitor C2 is shortened. As a result, the time until the transistor Q2 is turned ON is shortened, and the time until the FET Q1 is turned off, that is, the time while the FET Q1 is ON is shortened. When the time while the FET Q1 is ON is short, the magnetic energy accumulated in the transformer T is also smaller, the voltage V2 generated in the secondary winding N2 is also dropped, and the output voltage is reduced. Because the time while the FET Q1 is OFF is shortened proportional to the time while the FET Q1 is ON, the switching frequency of the switching power supply apparatus 1 is increased by the shortening of the time while the FET Q1 is ON and OFF.

On the contrary, when the load (not shown in the figure) to be connected to the switching power supply apparatus 1 is increased, and the output voltage drops, the current flowing in the photo-transistor PT of the photo coupler PC is decreased, the charging time of the capacitor C2 is increased, the time until the FET Q1 is turned off, that is, the time while the FET Q1 is ON becomes longer, the voltage V2 generated in the secondary winding N2 is increased, and the output voltage is increased. Because the time while the FET Q1 is ON is longer, the switching frequency of the switching power supply apparatus 1 is reduced. In this way, the voltage is stabilized in the switching power supply apparatus 1.

While the FET Q1 is turned off and while the FET Q1 is turned on, there exists a condition where the voltage is applied between the drain and the source of the FET Q1 and moreover, the current flows though the time is short. A loss in the FET Q1 is generated in this condition (hereinafter, referred to as the "switching loss"). Because the switching loss is generated whenever the FET Q1 is turned on and turned off, the magnitude of the switching loss affects the efficiency of the switching power supply apparatus 1. Also, because the total switching loss during the prescribed period is proportional to the switching frequency of the FET Q1, the switching frequency also affects the efficiency of the switching power supply apparatus 1.

To explain the mechanism of generation of the switching loss, FIGS. 9A and 9B indicate the time change of the voltage Vds between the drain and the source of the FET Q1 during the turn-OFF and the current I1 flowing therein on an expanded time scale. FIGS. 10A and 10B show the time change of the voltage Vds between the drain and the source of the FET Q1 during the turn-ON and the current I1 flowing therein, the current I2 flowing in the secondary winding N2, the voltage Vb generated in the feedback winding Nb, and the voltage Vgs between the gate and the source of the FET Q1 in the expanded time scale.

Firstly, during the turn-OFF, after the transistor Q2 is turned ON, a voltage of negative polarity is generated in the feedback winding Nb, the charge accumulated in the gate of the FET Q1 is absorbed through the capacitor C3 and the resistor Rb, and the gate voltage Vgs is rapidly reduced to turn OFF the FET Q1. However, as indicated in FIG. 9A, a certain time is required until the current flowing in the FET Q1 is completely 0 and the voltage Vds between the drain and the source is increased and stabilized. During this time, the voltage is applied between the drain and the source of the FET Q1 and the current flows, and the switching loss is generated. The hatched part in FIG. 9A is the part corresponding to the switching loss, and the area indicates the magnitude of the switching loss. The area of the hatched part is reduced so as to reduce the switching loss, and for this purpose, the turn-off speed of the FET Q1 is increased. This can be achieved by reducing the resistance of the resistor Rb as much as possible so as to easily allow current directed from the gate of the FET Q1 to the feedback winding Nb to flow. On the contrary, if the resistance of the resistor Rb is increased, the turn-off speed is reduced, the voltage is applied between the drain and the source of the FET Q1 as indicated in FIG. 9B, the current-flowing time is increased, and the area of the hatched part, that is, the switching loss is increased.

On the other hand, during the turn-on, as indicated in FIG. 10A, the operation is started from the time point when the current I2 flowing in the secondary winding N2 is 0. When the current I2 flowing in the secondary winding N2 is 0, the voltage V2 (not shown in the figure) generated in the secondary winding N2, the voltage Vb generated in the feedback winding Nb, and the voltage Vds between the drain and the source of the FET Q1 are attenuated in an oscillating manner as indicated by the dotted line, reaching to a certain value. The voltage Vb of the feedback winding Nb is temporarily changed from the negative polarity to the positive polarity and turned into the kick voltage, and the current flowing in the feedback winding Nb flows into the gate of the FET Q1 through the resistor Rb and the capacitor C3. When the voltage Vgs between the gate and the source of the FET Q1 exceeds the threshold Vth, the FET Q1 is turned on. When the turn-on speed of the FET Q1 is large, the current I1 starts to flow before the voltage Vds between the drain and the source of the FET Q1 has not sufficiently dropped. Because a certain time is required before the voltage between the drain and the source of the FET Q1 is 0V, the greater the voltage that is applied between the drain and the FET Q1 source of the, the sooner the FET Q1 is turned on, and the longer the current flows, and the time of generating the switching loss indicated by the hatching in FIG. 10A becomes longer. To reduce the switching loss, the turn-on time of the FET Q1 can be delayed to some degree, and for this purpose, the current from the feedback winding Nb to the gate of the FET Q1 through the resistor Rb and the capacitor C3 is difficult to cause to flow by increasing the resistance of the resistor Rb to some degree. FIG. 10B indicates the timing when the resistance of the resistor Rb is increased to some degree, and because the time that the voltage Vgs between the gate and the source of the FET Q1 reaches the threshold is long, the FET Q1 is turned on after the voltage Vds between the drain and the source of the FET Q1 has sufficiently dropped, the time of generating the switching loss is shortened, and the voltage Vds between the drain and the source of the FET Q1 is also dropped.

To reduce the switching loss during the turn-off, the resistance of the resistor Rb is required to be small, while, to reduce the switching loss during the turn-on, the resistance of the resistor Rb is required to be large. Thus, the resistance of the resistor Rb is in a conflicting relationship between the turn-on and the turn-off, and required to be set to an appropriate value in a balanced manner, and in any case, this has been a difficult problem in reducing the switching loss.

Further, as described above, the switching power supply apparatus of an RCC system is characterized in that the switching frequency is increased as the load is decreased, and there is a problem that the switching loss is increased for a particularly small load because the switching loss is proportional to the switching frequency.

The basic structure of the switching power supply apparatus illustrated in FIG. 11 is disclosed in Japanese Unexamined Patent Publication No. 8-80041. In FIG. 11, the same symbol is attached to the part same as or equivalent to the part in FIG. 7, and its explanation is omitted.

In the switching power supply apparatus 6 in FIG. 11, the difference from the switching power supply apparatus 1 in FIG. 7 is that the diode D3 and a resistor R8 which are connected to each other in series, are connected in parallel to the resistor Rb in the control circuit 7. The anode of the diode D3 is connected to the gate side of the FET Q1 and the cathode is connected toward one end side of the feedback winding Nb.

In such a construction, by setting the resistance of the resistor Rb to a large value, and setting the resistance of the resistor R8 to be smaller than the resistance of the resistor Rb, the charge accumulated in the gate of the FET Q1 by the parallel resistance of the resistors Rb and R8 (approximately agreed with the resistor R8 of substantially small resistance) is rapidly absorbed by the feedback winding Nb to increase the turn-off speed during the turn-off of the, while the gate voltage Vgs of the FET Q1 delays exceeding the threshold if the resistor Rb is set to a large resistance, and the turn-off timing is delayed during the turn-on of the FET Q1.

However, also in this case, the turn-on time is dependent only on the resistance of the resistor Rb, and the turn-on timing of the FET Q1 is delayed, that means, reduction of the switching frequency is limited. Further, the FET Q1 is required to be rapidly turned on after the FET Q1 is started to be turned ON, but it takes long before the turn-on time of the FET Q1 if the resistance of the resistor Rb is excessively increased, and the switching loss is increased all the more.

Thus, there is a need for a switching power supply apparatus capable of reducing the switching loss both during the turn-off and the turn-on of the switching element, and for suppressing the increase of the switching frequency during small loading conditions to reduce the switching loss.

SUMMARY OF THE INVENTION

The switching power supply apparatus of the present invention comprises: a transformer having a primary winding, a secondary winding and a feedback winding, a switching element connected in series to the primary winding, a control circuit provided between a control terminal of the switching element and the feedback winding, a rectifying circuit connected to the secondary winding, further wherein a control element is provided between the control terminal of the switching element and the feedback winding, and a delay circuit being connected to a control terminal of the control element.

A resistor may be provided in parallel to the control element.

The control element may comprise a PNP transistor in which a base is the control terminal, an emitter is connected to one end of the feedback winding, a collector is connected to the control terminal of the switching element, and the delay circuit may comprise a capacitor connected between the emitter and the base of the transistor and a resistor connected between the base of the transistor and the other end of the feedback winding.

Alternatively, the control element may comprise an NPN transistor in which a base is the control terminal, a collector is connected to one end of the feedback winding, an emitter is connected to the control terminal of the switching element, and the delay circuit may comprise a capacitor connected between the emitter and the base of the transistor and a resistor connected between the collector and the base of the transistor.

According to the present invention, the turn-on timing of the switching element is delayed by separating the current flow between the control terminal of the switching element and the feedback winding for the turn-on and for the turn-off of the switching element, and delaying the timing when the current due to the kick voltage flows in the control terminal of the switching element by the control element and the delay circuit during the turn-on, while the switching loss can be reduced by easily causing the current to flow from the control terminal of the switching element to the feedback winding to reduce the turn-off time during the turn-on. Further, by delaying the turn-on timing of the switching element, the increase of the switching frequency can be suppressed, and the switching loss can also be reduced thereby. In addition, the turn-on delay time of the switching element is shortened and the switching loss is further reduced by connecting a resistor of large resistance to the control element in parallel.

For the purpose of illustrating the invention, there is shown in the drawings several forms which are presently preferred, it being understood, however, that the invention is not limited to the precise arrangements and instrumentalities shown.

Other features and advantages of the present invention will become apparent from the following description of the invention which refers to the accompanying drawings.

BRIEF DESCRIPTION OF THE DRAWINGS

FIGS. 2A and 2B are graphs of the time change of the voltage and the current of each part when the switching power supply apparatus in FIG. 1 is turned on.

FIG. 3 is a graph illustrating the relationship between the output voltage and the switching frequency of the switching power supply apparatus in FIG. 1.

FIG. 6 is a graph of the time change of the voltage and the current of each part when the switching power supply apparatus in FIG. 5 is turned on.

FIGS. 10A and 10B are graphs of the time change of the voltage and the current of each part when the switching power supply apparatus in FIG. 7 is turned on.

DETAILED DESCRIPTION OF EMBODIMENTS OF THE INVENTION

Hereinafter, the preferred embodiments of the present invention are explained in detail with reference to the drawings. The same symbol is given to each part the same as or equivalent to the part in FIG. 11, and the explanation thereof may be omitted.

Figure 1:
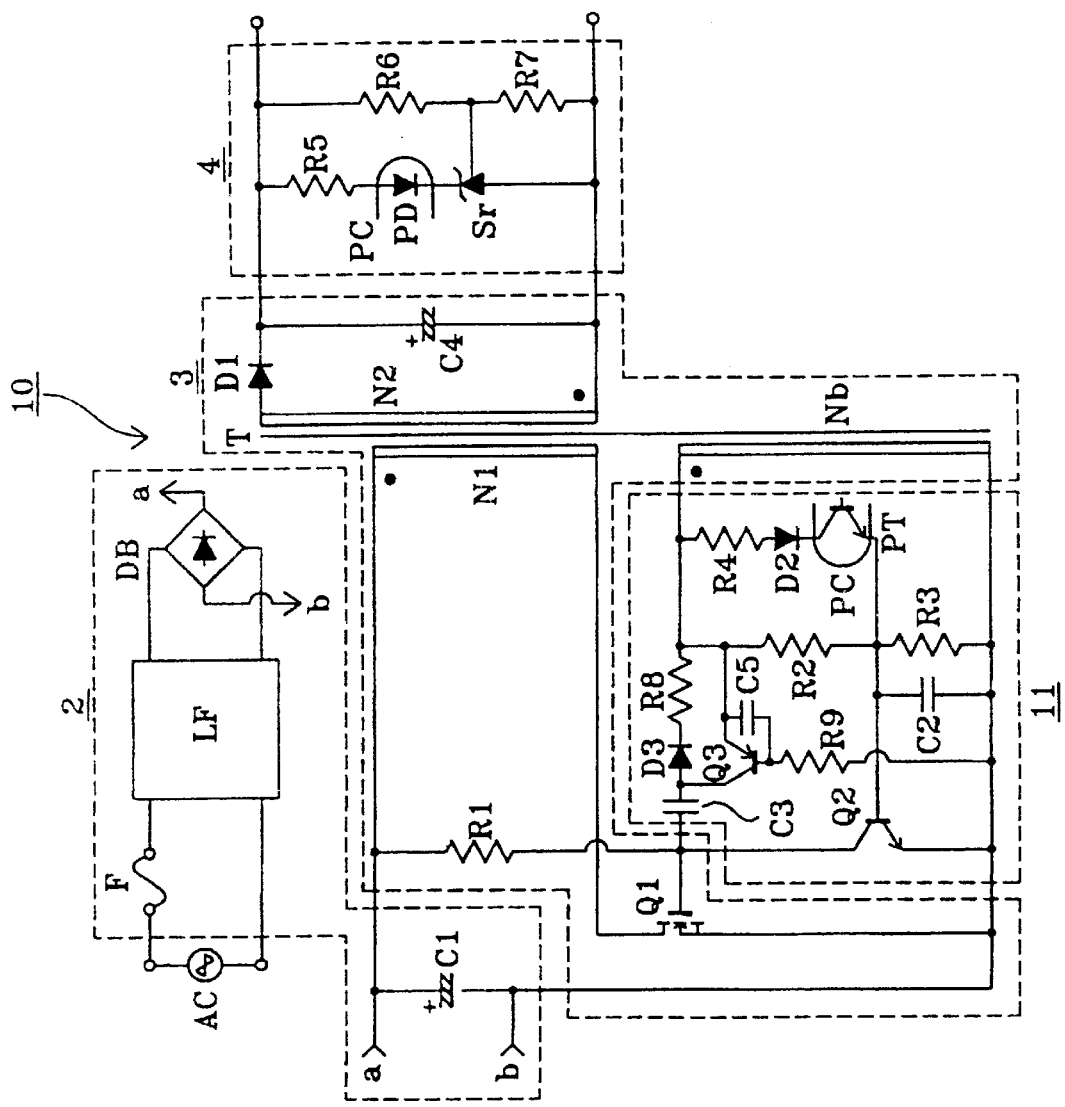
FIG. 1 is a block diagram illustrating one embodiment of a switching power supply apparatus of the present invention.
Figure 11:
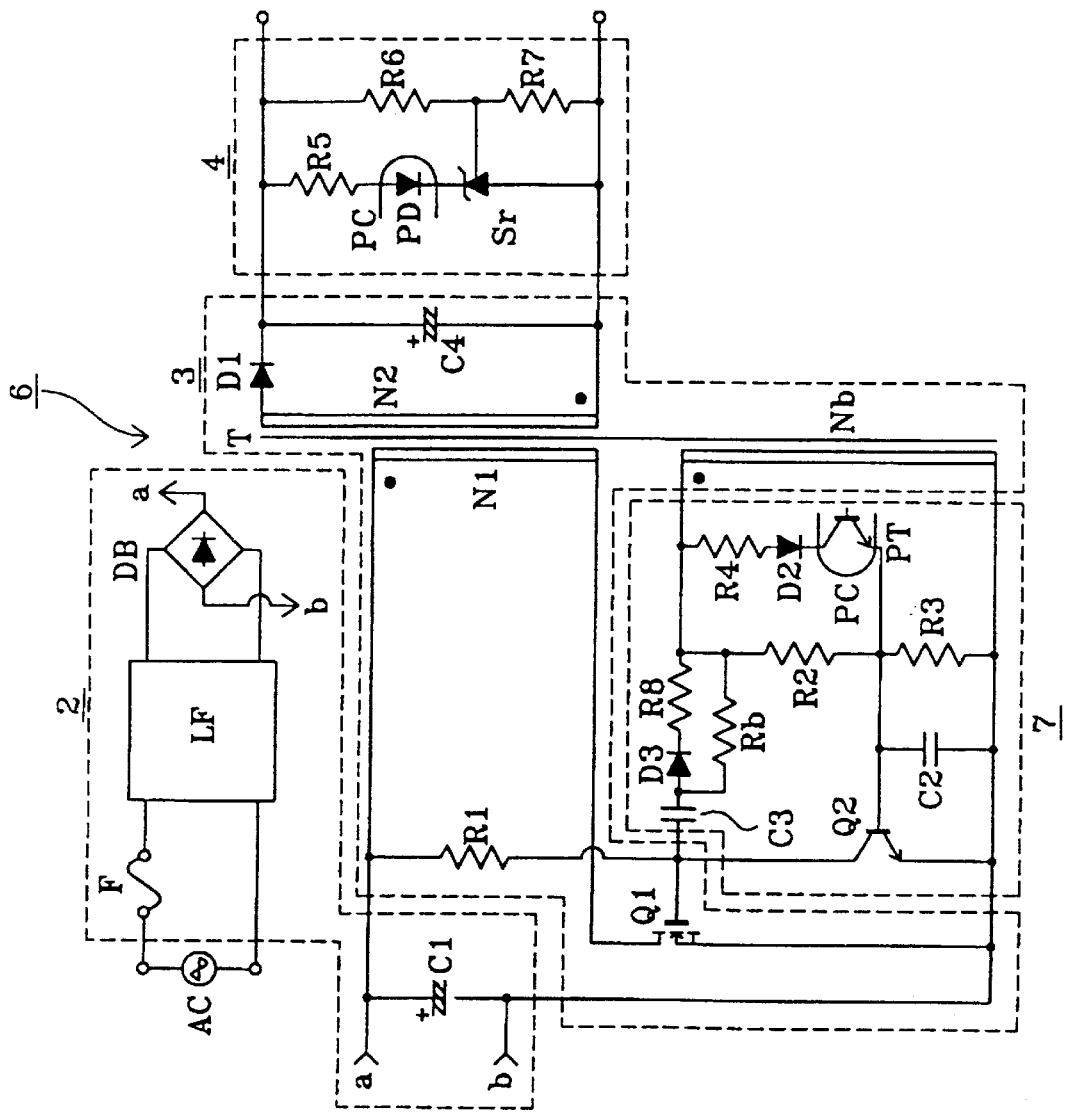
FIG. 11 is a block diagram illustrating another conventional switching power supply apparatus.

In the switching power supply apparatus 10 in FIG. 1, the difference from the switching power supply apparatus 6 in FIG. 11 is that a control element Q3 is provided in place of a resistor RB. The control element Q3 may be a bipolar transistor, e.g., a PNP transistor whose emitter is connected to one end of the feedback winding Nb and whose collector is connected to an anode of a diode D3. A resistor R9 is connected between the base which is a control terminal of the transistor Q3 and the other end of the feedback winding Nb, and a capacitor C5 is connected between the base and the emitter of the transistor Q3. The capacitor C5 and the resistor R9 constitute a delay circuit. The resistance of a resistor RB is set to a smaller value similar to that of the resistor R8 in the switching power supply apparatus 6 in FIG. 11.

In such a switching power supply apparatus 10, when the FET Q1 is turned off, the charge accumulated in the gate of the FET Q1 is rapidly absorbed to the feedback winding Nb by the resistor R8 which is set to be a small value, the turn-off speed is increased, and the switching loss during the turn-off is reduced.

On the other hand, when the FET Q1 is turned on, the current I1 starts to flow after the voltage Vds between the drain and the source of the FET Q1 drops to some degree by the current flowing from the feedback winding Nb due to the kick voltage generated in the feedback winding Nb in a delayed manner for the prescribed time by the delay circuit comprising the capacitor C5 and the resistor R9 and the transistor Q3 which is the control element.

Figure 2A:
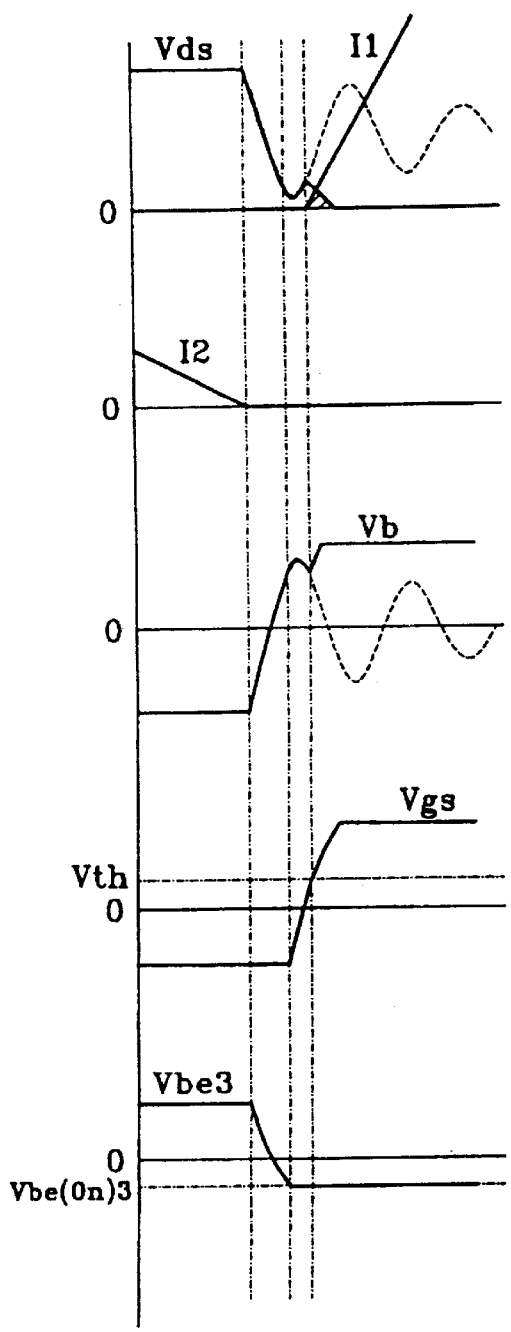
Figure 2B:
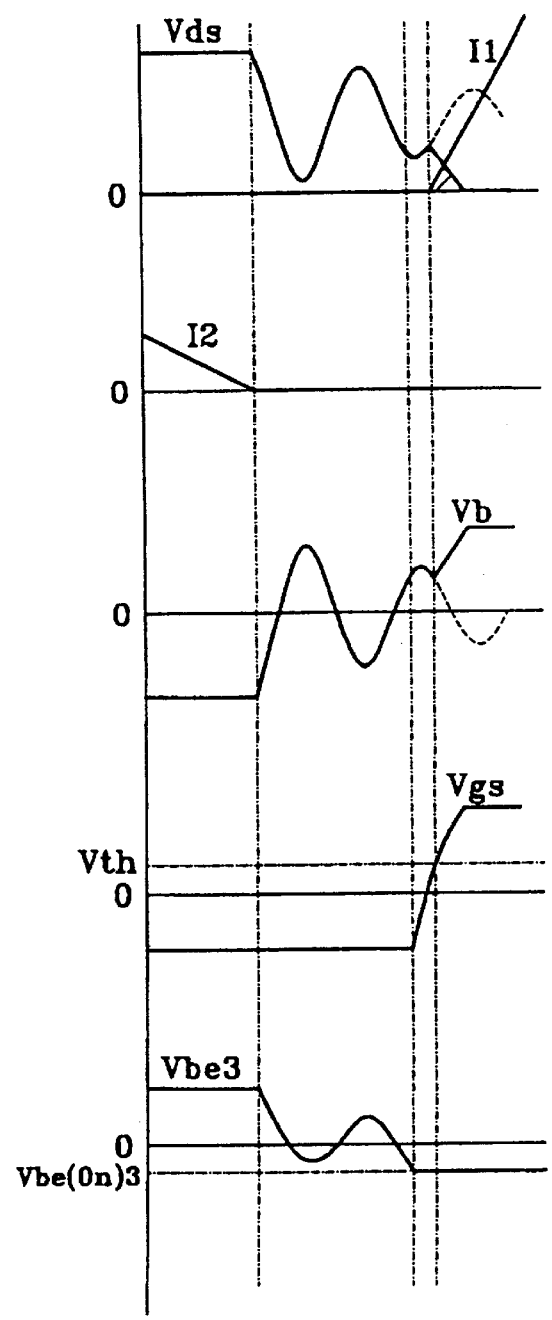

The operation of the delay circuit comprising capacitor C5 and resistor R9 coupled to the transistor Q3 is explained using the respective time changes of the voltage Vds between the drain and the source of the FET Q1 during the turn-on indicated in FIGS. 2A and 2B and the current I1 flowing therein, the current I2 flowing in the secondary winding N2, the voltage Vb generated in the feedback winding Nb, the voltage Vgs between the gate and the source of the, and the voltage Vbe3 between the base and the emitter of the transistor Q3.

As illustrated in FIG. 2A, when the current I2 flowing in the secondary winding N2 is 0, the voltage V2 generated in the secondary winding N2 (not shown in the figure), the voltage Vb generated in the feedback winding Nb, and the voltage Vds between the drain and the source of the FET Q1 are attenuated to be a certain value in an oscillating manner as indicated by the dotted line. The voltage Vb generated in the feedback winding Nb is temporarily changed from the negative polarity to the positive polarity and becomes the kick voltage, and the current flowing from the feedback winding Nb is first returned to the feedback winding Nb through the capacitor C5 and the resistor R9, and does not flow into the base of the transistor Q3. In this condition, the voltage Vbe3 between the base and the emitter of the transistor Q3, that is, the voltage across the capacitor C5 is changed to approximately 0V from the reverse-biased condition, while the transistor Q3 is still left in the OFF condition. As time lapses, and when the charge is accumulated in the capacitor C5 according to the time constant to be determined by the capacitor C5 and the resistor R9, the voltage Vbe3 between the base and the emitter of the transistor Q3 is biased negative, and reaches the forward voltage Vbe(on)3 between the base and the emitter. When the voltage Vbe3 between the base and the emitter reaches the forward voltage Vbe(on) 3 between the base and the emitter, the transistor Q3 is turned ON, the current abruptly flows in the gate of the FET Q1 between the emitter and the collector of the transistor Q3 from the feedback winding Nb by the kick voltage generated in the feedback winding Nb, and the voltage Vgs between the gate and the source of the FET Q1 exceeds the threshold Vth and the FET Q1 is turned on.

Thus, the turn-on timing of the FET Q1 can be appropriately delayed by combining the transistor Q3 which is the control element with the capacitor C5 and the resistor R9 to constitute the delay circuit, and the transition time from OFF to ON can be left short. As a result, the voltage between the drain and the source when the current starts to flow in the FET Q1 is reduced to some degree compared with the conventional value, the voltage is applied between the drain and the source, the time when the current flows is shortened, and generation of the switching loss can be reduced.

Further, the switching frequency of the switching power supply apparatus 10 is reduced by increasing the OFF time of the FET Q1. FIG. 3 shows the relationship between the output power of the switching power supply apparatus 10 and the switching frequency. Here, x1 indicates the characteristic of the conventional switching power supply apparatus 1 while x2 indicates the characteristic of the switching power supply apparatus 10 of the present invention. As indicated in FIG. 3, the switching frequency is rapidly increased as the output power is reduced (that is, the load is decreased) in the conventional switching power supply apparatus 1, while the increase of the switching frequency is suppressed in the switching power supply apparatus 10 of the present invention, and large fluctuation in the switching frequency is eliminated from a heavy load to the small load. As a result, the switching loss in the small load can be reduced in the switching power supply apparatus of the present invention.

The turn-on timing of the FET Q1 can be further delayed by further increasing the time constant of the delay circuit while the transition time from OFF to ON of the FET Q1 is left unchanged. In this case, the increase of the switching frequency can be further suppressed, and the switching loss can be further reduced.

A protective resistor may be connected in series to the emitter of the transistor Q2 though it is omitted in the embodiment in FIG. 1. In the embodiment in FIG. 1, the PNP transistor Q3 is used as the control element, and similar effect can be obtained by using a J-FET or MOS-FET of the P-channel type in which the source is connected to the feedback winding Nb side, and the drain is connected to the drain side of the FET Q1. More particularly, when a MOS-FET is used, the cost can be reduced by omitting the diode D3 and the resistor R8 to reduce the number of parts because of the intrinsic diode characteristic from the drain to the source.

Figure 4:
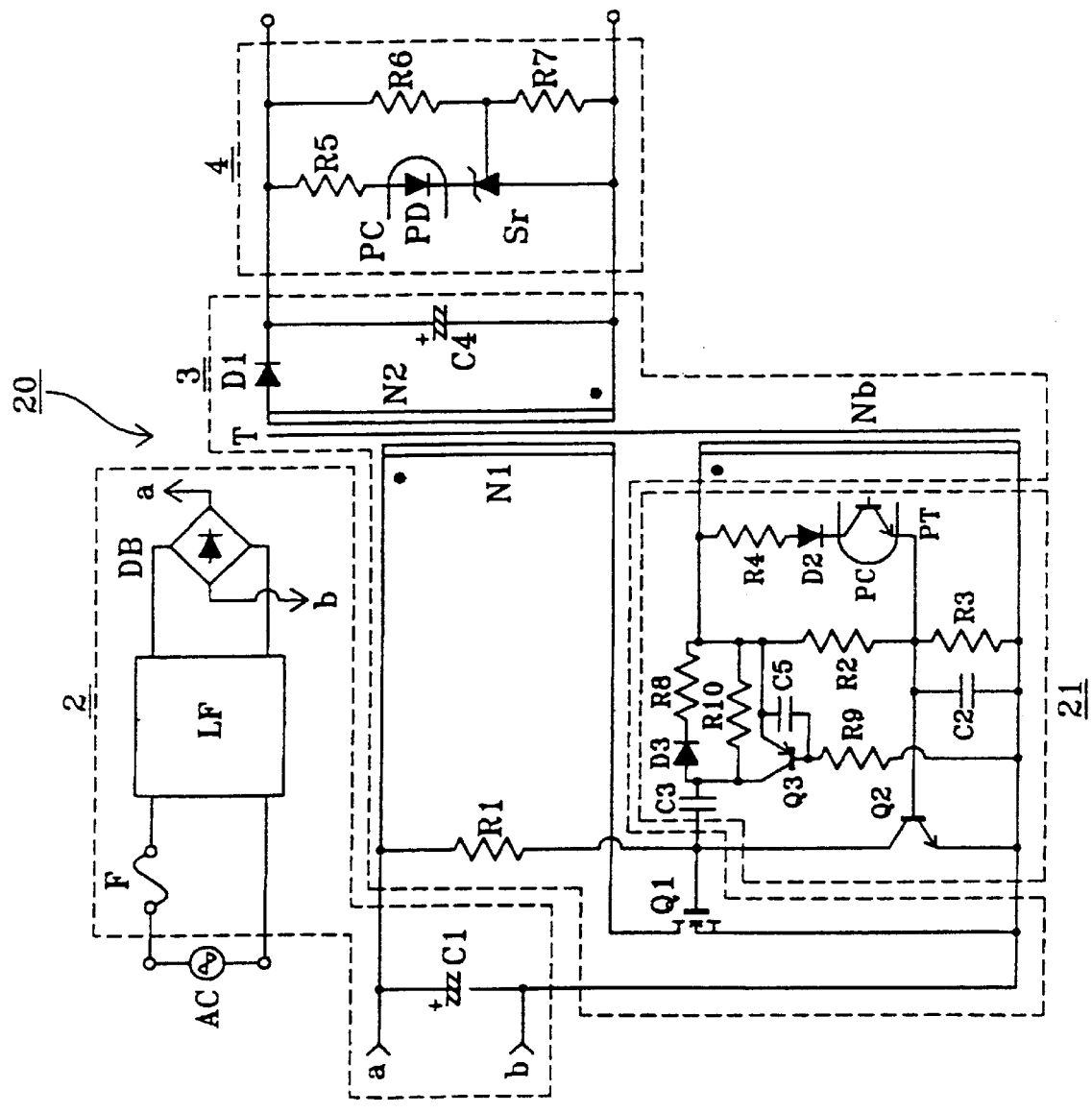
FIG. 4 is a block diagram illustrating another embodiment of the switching power supply apparatus of the present invention.

Another embodiment of the switching power supply apparatus of the present invention is illustrated in FIG. 4. In FIG. 4, the same symbol is attached to each part that is the same as or equivalent to a part in FIG. 1, and its explanation is omitted.

In the switching power supply apparatus 20 in FIG. 4, the difference from the switching power supply apparatus 10 in FIG. 1, is that a resistor R10 is connected in parallel between the collector and the emitter of the transistor Q3 which is the control element in a control circuit 21. The resistance of the resistor R10 is set to be a larger value than the resistance of the resistor Rb of the conventional switching power supply apparatus 6 of FIG. 11. The values of the resistor R10 and of the capacitor C5 and the resistor R9 comprising the delay circuit are set so that the voltage Vgs between the gate and the source of the FET Q1 reaches the threshold immediately before the voltage Vbe3 between the base and the emitter of the transistor Q3 reaches the forward voltage Vbe(on)3 between the base and the emitter.

In this switching power supply apparatus 20, the operation during the turn-off of the FET Q1 is the same as that of the switching power supply apparatus 10, and its explanation is omitted.

The operation during the turn-on of the FET Q1 is the same as that of the conventional switching power supply apparatus 6 in FIG. 11 until the voltage Vgs between the gate and the source of the FET Q1 is increased and reaches the threshold. However, in the switching power supply apparatus 20, the current I1 starts to flow in the primary winding N1 by turning ON the FET Q1, and when the kick voltage is generated in the feedback winding Nb, the voltage Vbe3 between the base and the emitter of the transistor Q3 immediately reaches the forward voltage Vbe(on)3 and the transistor Q3 is turned ON. When the transistor Q3 is turned ON, most of the current generated by the kick voltage generated in the feedback winding Nb reaches the gate of the FET Q1 through the transistor Q3, and the turn-on operation of the FET Q1 is accelerated. Because the voltage Vgs between the gate and the source of the FET Q1 reaches the threshold Vth at the time when the transistor Q3 is turned ON, the so-called turn-on delay time for the voltage Vgs between the gate and the source to reach from 0 to the threshold Vth is reduced.

The effect of the turn-on delay time in the switching power supply apparatus 6 in FIG. 11 can be reduced in the switching power supply apparatus 20 by providing the resistor R10 between the collector and the emitter of the transistor Q3.

Figure 5:
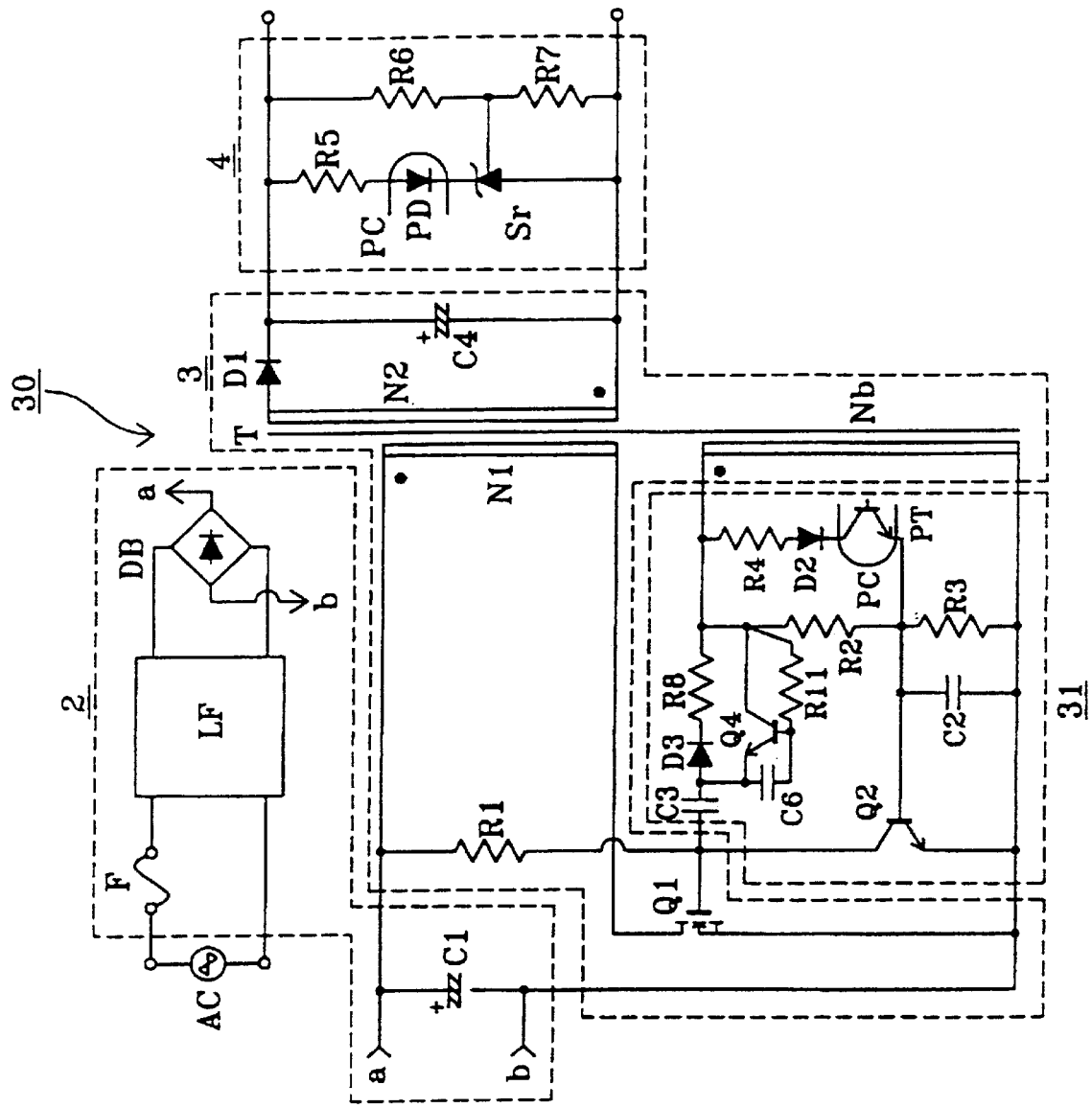
FIG. 5 is a block diagram illustrating still another embodiment of the switching power supply apparatus of the present invention.

FIG. 5 is still another embodiment of the present invention. In FIG. 5, the same symbol is attached to each part that is the same as or equivalent to the part in FIG. 1, and its explanation is omitted.

In a switching power supply apparatus 30 in FIG. 5, the difference from the switching power supply apparatus 10 in FIG. 1 is only that, in a control circuit 31, an NPN transistor Q4 is provided as the control element. The collector of transistor Q4 is connected to one end of the feedback winding Nb, and the emitter is connected to the anode of the diode D3. A resistor R11 is connected between the base and the collector. A capacitor C6 is connected between the base and the emitter of the transistor Q4. The capacitor C6 and the resistor R11 constitute the delay circuit.

In such a switching power supply apparatus 30, the operation during the turn-off of the FET Q1 is the same as the operation of the switching power supply apparatus 10, and its explanation is omitted.

Figure 6:
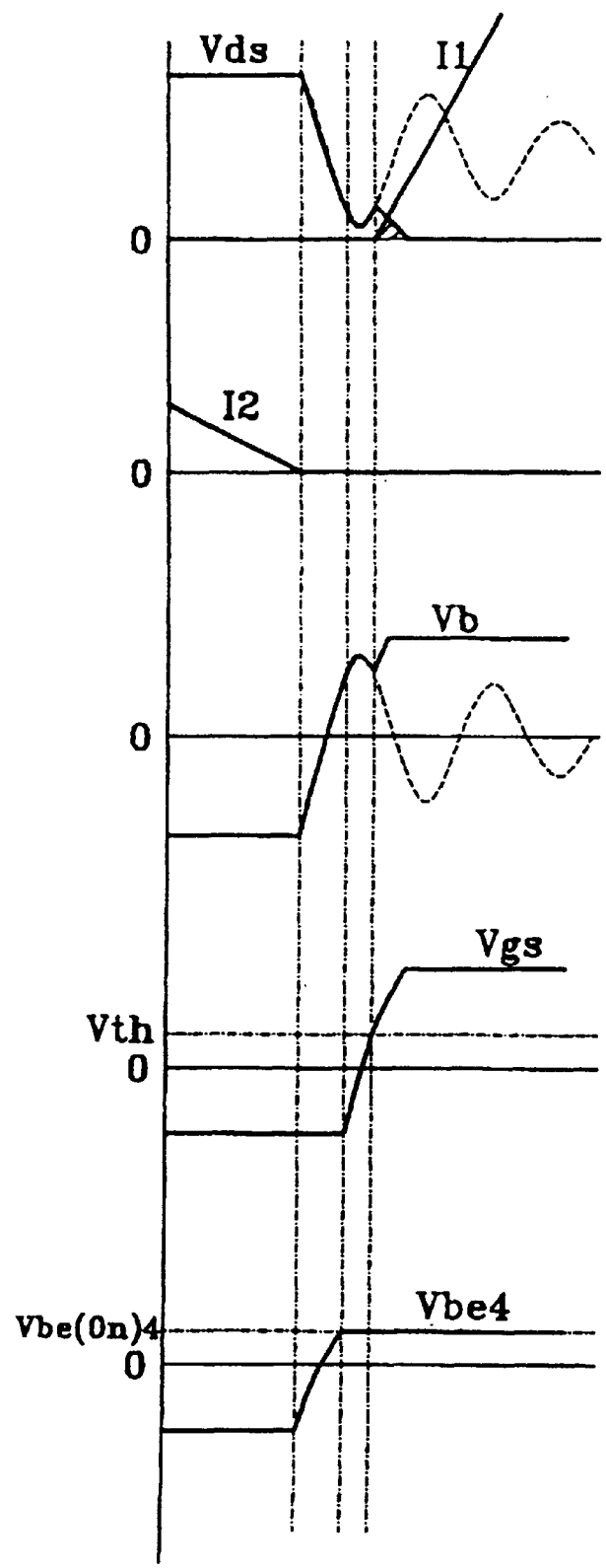
Figure 7:
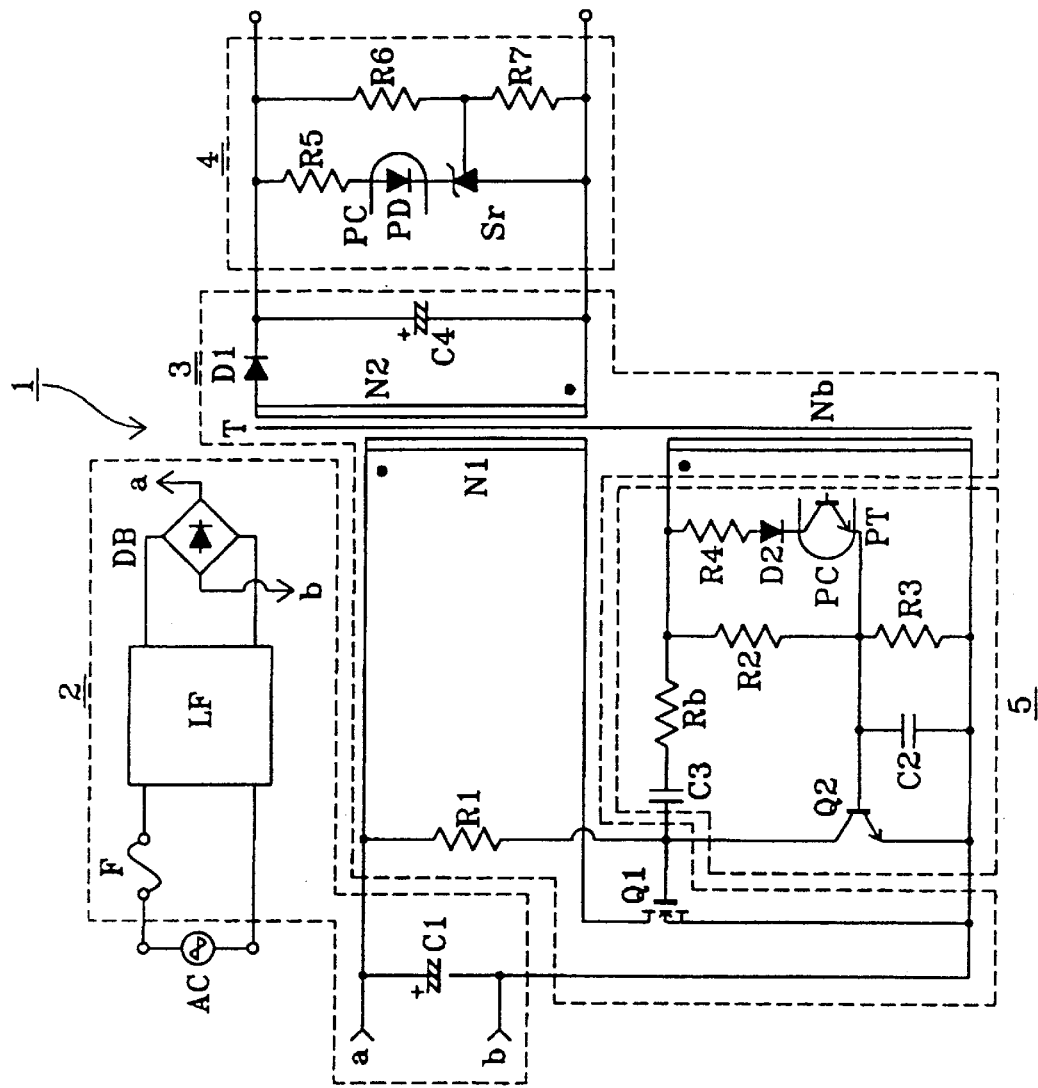
FIG. 7 is a block diagram illustrating a conventional switching power supply apparatus.
Figure 8:
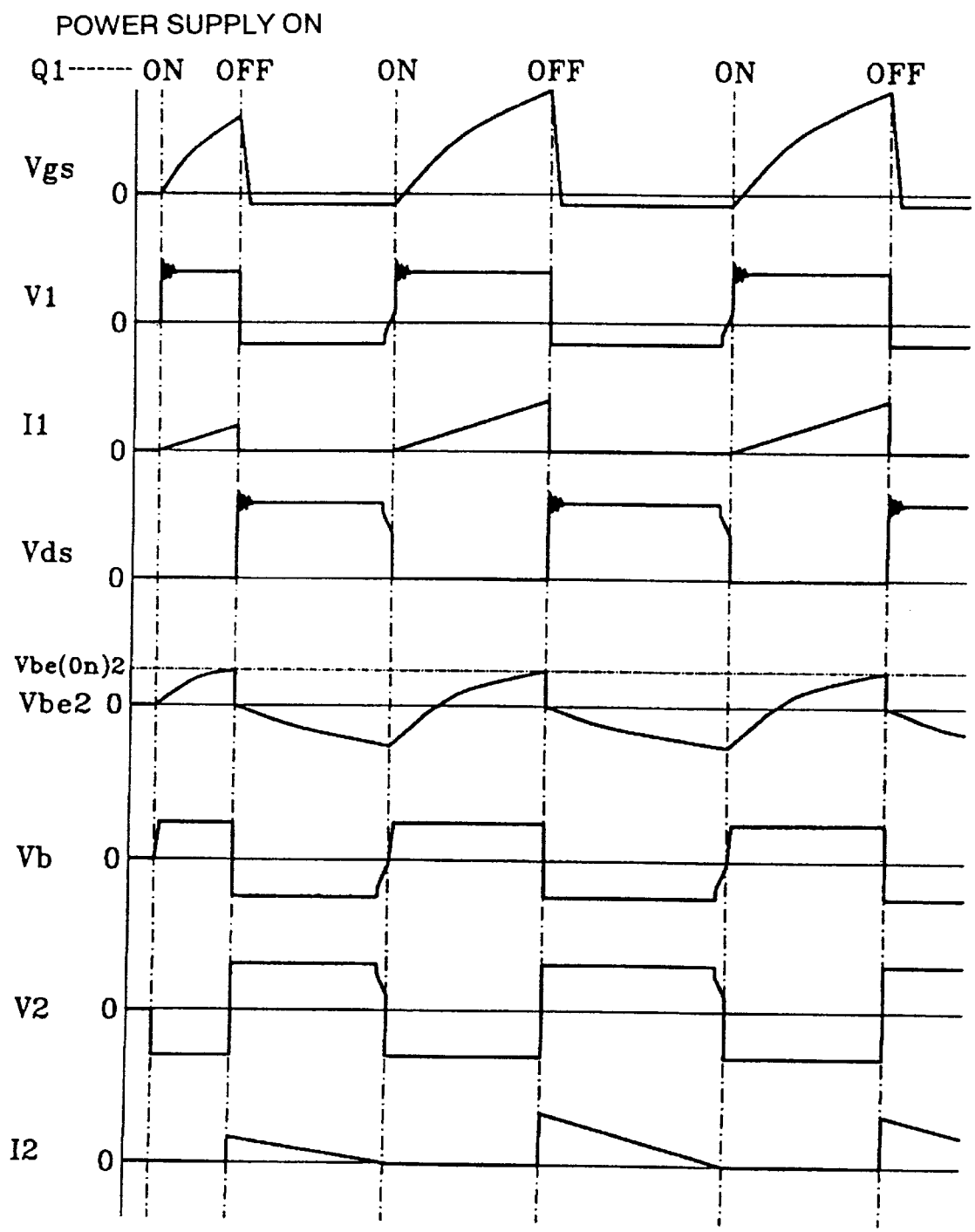
FIG. 8 is a graph of the time change of the voltage and the current of each part of the switching power supply apparatus in FIG. 7.
Figure 9A:
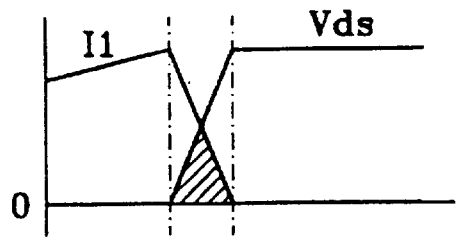
FIGS. 9A and 9B are graphs of the time change of the voltage and the current to be applied to a switching element when the switching power supply apparatus in FIG. 7 is turned off.
Figure 9B:
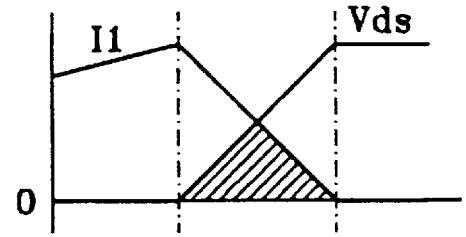
Figure 10A:
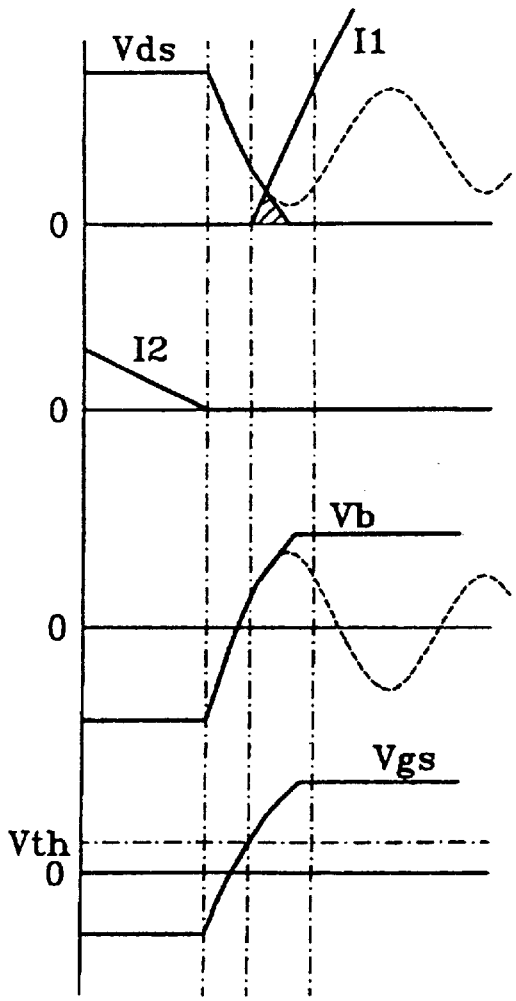
Figure 10B:
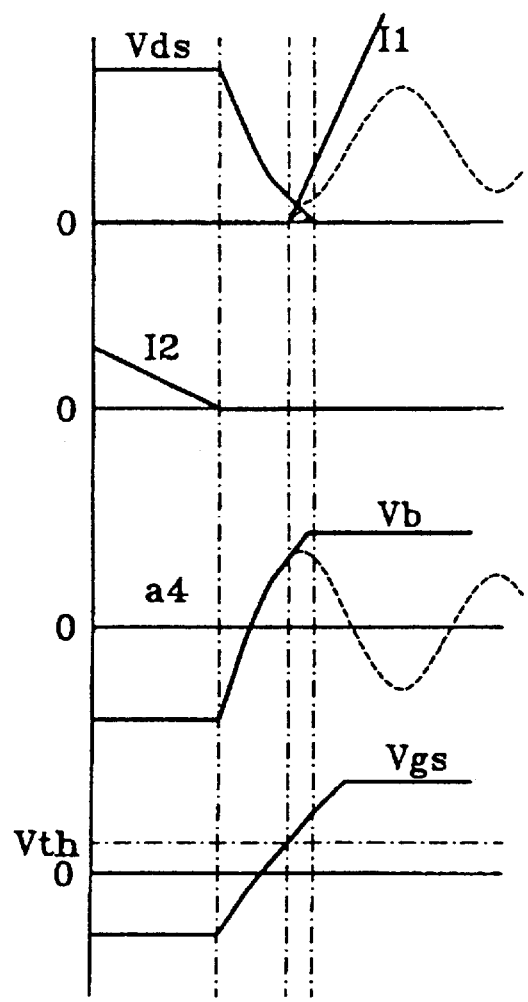

During the turn-on of the, the current flowing from the feedback winding Nb due to the kick voltage generated in the feedback winding Nb is delayed for a certain time by the delay circuit comprising the resistor R11 and the capacitor C6 and the transistor Q4 so as to flow in the base of the, and the current I1 starts to flow after the voltage Vds between the drain and the source of the FET Q1 is drops to some degree. The operation of the transistor Q4 which is the control element, and the operation of the resistor R11 and the capacitor C6 comprising the delay circuit are explained using the time change of the voltage Vds between the drain and the source of the FET Q1 during the turn-on indicated in FIG. 6 and the current I1 flowing therein, the current I2 flowing in the secondary winding N2, the voltage Vb generated in the feedback winding Nb, the voltage Vgs between the gate and the source of the, the base potential Vb4 of the transistor Q4, and the voltage Vbe4 between the base and the emitter.

When the current I2 flowing in the secondary winding N2 becomes 0, the voltage V2 generated in the secondary winding N2 (not shown in the figure), the voltage Vb generated in the feedback winding Nb, and the voltage Vds between the drain and the source of the FET Q1 are attenuated to be a certain value in an oscillating manner as indicated by the dotted line. The voltage Vb of the feedback winding Nb is temporarily changed from the negative polarity to the positive polarity to be the kick voltage, and the current flowing from the feedback winding Nb flows into the capacitor C6 through the resistor R11, and does not flow into the base of the transistor Q4. The voltage Vbe4 between the base and the emitter of the transistor Q4, that is, the voltage across capacitor C6, becomes approximately 0V from the negative-biased condition while the transistor Q4 is left in OFF condition. When the charge is accumulated in the capacitor C6 according to the time constant determined by the capacitor C6 and the resistor R11 as the elapse of time, the voltage Vbe4 between the base and the emitter of the transistor Q4 is positive-biased and reaches the forward voltage Vbe(on)4 between the base and the emitter. When the voltage Vbe4 between the base and the emitter reaches the forward voltage Vbe(on)4 between the base and the emitter, the transistor Q4 is turned ON, the current flows in the gate of the FET Q1 all at once between the collector and the emitter of the transistor Q4 from the feedback winding Nb, and the voltage Vgs between the gate and the source of the FET Q1 exceeds the threshold Vth and the FET Q1 is turned on.

The turn-on timing of the FET Q1 can be appropriately delayed by combining the transistor Q4 which is the control element and the resistor R11 and the capacitor C6 comprising the delay circuit, and the transition time from OFF to ON can be kept short. As a result, the voltage between the drain and the source when the current starts to flow in the FET Q1 can be reduced to some degree compared with the conventional one, the voltage is applied between the drain and the source, the current-flowing time is shortened, and generation of the switching loss can be reduced. Further, by increasing the OFF time of the, the increase of the switching frequency of the switching power supply apparatus 10 can be suppressed, and the switching loss can be reduced.

In the embodiment in FIG. 5, an NPN transistor is used, and similar effect can be obtained by using a J-FET or MOS-FET of N-channel type in which the drain is connected to the feedback winding Nb side and the source is connected to the drain side of the FET Q1.

Similar to the embodiment in FIG. 4, the turn-on time of the FET Q1 can be shortened, and the switching loss can be further reduced by connecting a resistor of large resistance between the collector and the emitter of the transistor Q4.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A switching power supply apparatus comprising:
a transformer having a primary winding, a secondary winding and a feedback winding;
a switching element connected in series with said primary winding;
a control circuit provided between a control terminal of said switching element and said feedback winding; and
a rectifying circuit connected to said secondary winding;
wherein a control element is provided between a control terminal of said switching element and an end of said feedback winding on which a positive voltage is generated during an on state of said switching element and further comprising a delay circuit receiving a voltage from said feedback winding connected to the control terminal of said control element to delay a time of switching on said switching element.

2. The switching power supply apparatus of claim 1, wherein a resistor is provided in parallel to said control element.

3. A switching power supply apparatus comprising:
a transformer having a primary winding, a secondary winding and a feedback winding;
a switching element connected in series with said primary winding;
a control circuit provided between a control terminal of said switching element and said feedback winding; and
a rectifying circuit connected to said secondary winding;
wherein a control element is provided between a control terminal of said switching element and said feedback winding and a delay circuit is connected to the control terminal of said control element to delay a time of switching on said switching element; and further
wherein said control element comprises a PNP transistor in which a base is a control terminal, an emitter is connected to a first end of said feedback winding and a collector is connected to the control terminal of said switching element, and
wherein said delay circuit comprises a capacitor connected between the emitter and the base of said transistor and a resistor connected between the base of said transistor and a second end of said feedback winding.

4. A switching power supply apparatus comprising:
a transformer having a primary winding, a secondary winding and a feedback winding;
a switching element connected in series with said primary winding;
a control circuit provided between a control terminal of said switching element and said feedback winding; and
a rectifying circuit connected to said secondary winding;
wherein a control element is provided between a control terminal of said switching element and said feedback winding and a delay circuit is connected to the control terminal of said control element to delay a time of switching on said switching element; and further
wherein said control element comprises an NPN transistor in which a base is a control terminal, a collector is connected to a first end of said feedback winding and an emitter is connected to the control terminal of said switching element, and
wherein said delay circuit comprises a capacitor connected between the emitter and the base of said transistor and a resistor connected between the collector and the base of said transistor.

5. A switching power supply apparatus comprising:
a transformer having a primary winding, a secondary winding and a feedback winding;
a switching element connected in series with said primary winding;
a control circuit provided between a control terminal of said switching element and said feedback winding; and
a rectifying circuit connected to said secondary winding;
wherein a control element is provided between a control terminal of said switching element and said feedback winding and a delay circuit is connected to the control terminal of said control element to delay a time of switching on said switching element;

further wherein a resistor is provided in parallel to said control element; and further wherein said control element comprises a PNP transistor in which a base is a control terminal, an emitter is connected to one end of said feedback winding and a collector is connected to the control terminal of said switching element, and wherein said delay circuit comprises a capacitor connected between the emitter and the base of said transistor and a resistor connected between the base of said transistor and a second end of said feedback winding.

6. A switching power supply apparatus comprising:

a transformer having a primary winding, a secondary winding and a feedback winding;

a switching element connected in series with said primary winding;

a control circuit provided between a control terminal of said switching element and said feedback winding; and a rectifying circuit connected to said secondary winding;

wherein a control element is provided between a control terminal of said switching element and said feedback winding and a delay circuit is connected to the control terminal of said control element to delay a time of switching on said switching element;

further wherein a resistor is provided in parallel to said control element; and further wherein said control element comprises an NPN transistor in which a base is a control terminal, a collector is connected to one end of said feedback winding and an emitter is connected to the control terminal of said switching element, and wherein said delay circuit comprises a capacitor connected between the emitter and the base of said transistor and a resistor connected between the collector and the base of said transistor.

7. The switching power supply apparatus of claim 1, wherein said control element and delay circuit provide a path for providing a feedback voltage from said feedback winding to a control input of said switching element to turn-on the switching element after a time delay and further comprising an additional path from said switching element to said feedback winding for allowing said switching element to discharge into said feedback winding whereby although the delay circuit provides a delay in turning the switching element on, substantially no delay is caused in turning the switching element off.

8. A switching power supply apparatus comprising:

a transformer having a primary winding, a secondary winding and a feedback winding;

a switching element connected in series with said primary winding;

a control circuit provided between a control terminal of said switching element and said feedback winding; and a rectifying circuit connected to said secondary winding;

wherein a control element is provided between a control terminal of said switching element and said feedback winding and a delay circuit is connected to the control terminal of said control element to delay a time of switching on said switching element; and further wherein said control element and delay circuit provide a path for providing a feedback voltage from said feedback winding to a control input of said switching element to turn-on the switching element after a time delay and further comprising an additional path from said switching element to said feedback winding for allowing said switching element to discharge into said feedback winding whereby although the delay circuit provides a delay in turning the switching element on, substantially no delay is caused in turning the switching element off; and further wherein the additional path comprises a resistance and diode coupled in series with each other allowing current to flow from the switching element to the feedback winding, the resistance and diode being coupled across said control element.

9. The switching power supply apparatus of claim 1, wherein the delay circuit has a time constant which controls a time of turning on the control element in response to a feedback voltage from the feedback winding, the control element turning on after a predetermined time delay to couple the feedback voltage to the switching element to turn the switching element on.

10. A method for controlling a switching power supply apparatus comprising, a transformer having a primary winding, a secondary winding, and a feedback winding; a switching element connected in series with said primary winding; a control circuit provided between a control terminal of said switching element and said feedback winding; and a rectifying circuit connected to said secondary winding; the method comprising:

providing a positive feedback voltage from the feedback winding generated during an on state of the switching element through a control element coupled between a control terminal of said switching element and said feedback winding, and delaying a turn-on time of the control element using a delay circuit receiving a voltage from said feedback winding to delay coupling the feedback voltage to the control terminal of the switching element thereby to delay a time of switching on said switching element.

11. The method of claim 10, wherein said steps of providing and delaying comprise providing a path for a feedback voltage from the feedback winding to a control input of the switching element to turn-on the switching element after a time delay and further comprising providing an additional path from said switching element to said feedback winding for allowing said switching element to discharge into said feedback winding whereby a delay is provided in turning the switching element on, but substantially no delay is caused in turning the switching element off.

* * * * *